United States Patent [19]

Kadunce et al.

[11] Patent Number: 5,110,336
[45] Date of Patent: May 5, 1992

[54] METHOD OF USING AMORPHOUS PRECIPITATED SILICA PARTING MATERIAL FOR SHAPING GLASS SHEET DOUBLETS

[75] Inventors: Randy R. Kadunce, New Kensington; Paul W. Bush, Delmont; Pamela L. Martino, New Kensington, all of Pa.

[73] Assignee: PPG Industries, Inc., Pittsburgh, Pa.

[21] Appl. No.: 635,018

[22] Filed: Dec. 28, 1990

[51] Int. Cl.$^5$ .................. C03B 40/00; C03B 23/023
[52] U.S. Cl. .......................... 65/24; 65/106; 65/107; 156/276; 427/154
[58] Field of Search .................. 65/24, 703, 106, 107; 156/276; 427/154

[56] References Cited

U.S. PATENT DOCUMENTS

| | | | |
|---|---|---|---|
| 2,314,325 | 3/1943 | Binkert | 65/24 X |
| 2,725,320 | 11/1955 | Atkeson et al. | 65/24 X |
| 3,071,501 | 1/1963 | Cowley et al. | 65/24 |
| 3,918,948 | 11/1975 | Monzi | 65/106 X |
| 4,095,994 | 6/1978 | Crawford et al. | 106/308 |
| 4,263,051 | 4/1981 | Crawford et al. | 106/308 |
| 4,681,750 | 7/1987 | Johnson et al. | 423/339 |
| 4,927,802 | 5/1990 | Leatherman | 503/214 |

OTHER PUBLICATIONS

PPG Lo-Vel HSF Silica Flatting Agent.
PPG Lo-Vel 27 Silica Flatting Agent Bulletins 87A, B, and C.
PPG Comparison Chart Silica Flatting Agents.

*Primary Examiner*—Robert L. Lindsay
*Attorney, Agent, or Firm*—Andrew C. Siminerio; Donald C. Lepiane; Gay Ann Spahn

[57] ABSTRACT

The number of bent laminated glass windshields having bull's-eyes that adversely affect its optical properties is reduced by using amorphous precipitated silica particles such as is used as flatting agents for paints, as a parting material between a pair of glass sheets during bending. The particles form relatively soft agglomerates that are milled and classified to produce a narrow distribution of particle sizes as compared to the distribution found in untreated silica, such as diatomaceous earths previously used as a parting material.

18 Claims, No Drawings

METHOD OF USING AMORPHOUS PRECIPITATED SILICA PARTING MATERIAL FOR SHAPING GLASS SHEET DOUBLETS

BACKGROUND OF THE INVENTION

1. Field of the Invention

This invention relates to parting material that is interposed between the facing surfaces of a pair of matched glass sheets that are bent simultaneously at elevated temperatures while supported in bending relation to a mold for bending glass sheets.

2. Technical Problems and Prior Art

When glass sheets are shaped in pairs to the shape desired for laminated windshields, it is necessary to separate the sheets after bending and assemble them as a sandwich with a plastic interlayer therebetween. Unless a suitable parting material is interposed between the glass sheets, the elevated temperature needed to sag the glass sheets by gravity to conform to a shaping mold or to simultaneously press bend overlaying glass sheets may cause the glass sheets to stick together during their shaping, making their separation without resultant glass damage impossible. This precludes the insertion of an interlayer between the bent glass sheets for final lamination.

Prior to this invention, natural silica deposits in the form of diatomaceous earths identified by the trade name CELITE ® available from Manville Product Corporation, Colorado, were milled and mixed in an aqueous slurry and applied by spray to a major surface of one of the glass sheets of a pair to bent simultaneously in a manner well known to those skilled in the art. The diatomaceous earth particles kept the glass sheets in closely spaced relation as they sagged in unison to conform to the shape of the glass sheet shaping mold. However, diatomaceous earth particles have a random distribution of size and are hard in nature which, as the prior art does not appreciate, may cause a defect in the form of small round spots, or optical distortions commonly termed as a bull's-eye, that appear in the laminated windshields.

Also prior to this invention, amorphous precipitated silica was available as a flatting agent for paint and for manufacturing microporous battery separators. U.S. Pat. Nos. 4,095,994 and 4,263,051 to Crawford et al. recite various silica compositions useful as flatting agents for paints and U.S. Pat. No. 4,681,750 to Johnson et al. recites amorphous, precipitated silica compositions useful for manufacturing microporous battery separators and methods of preparing such silica compositions.

There is no suggestion in these patents of using precipitated silica compositions as parting materials between glass sheets undergoing simultaneous bending by exposure to heat-softening temperature of said glass sheets.

BRIEF DESCRIPTION OF THIS INVENTION

According to a preferred embodiment of this invention, bent glass sheets have less tendency to show bull's-eyes and scratches when they are shaped in pairs using as the parting material, milled and classified particles of amorphous precipitated silica as compared to when diatomaceous earth is used as the parting material. These silica particles have a MOHS hardness rating of less than 1 and a narrower particle size distribution for use as the parting material when compared to diatomaceous earth.

In a preferred embodiment of the invention, the silica particle are produced by the process described in U.S. Pat. No. 4,681,750 to Johnson et al., particularly the first embodiment disclosed in the patent. Other precipitated amorphous silica particles produced by milling and classifying silica pellets prepared as described in U.S. Pat. No. 4,095,994 to Crawford et al., column 2 line 20 through column 30 line 53, also provide parting materials that are superior to the untreated diatomaceous earth silicas of the prior art, but less superior than the preferred embodiment.

In the prior art, particles such as quartz and crystalite are commonly found in the parting material such as diatomaceous earth. These materials have an MOHS hardness of about 7. When positioned between the interfacial surfaces of heat softened glass sheets, oversized particles will penetrate the glass surface during bending, forming a bull's-eye. The use of amorphous, precipitated silica particles significantly reduces this defect. More particularly, the silica particles used as the parting material as disclosed in the present invention are considerably softer than the untreated silica used in the prior art and are susceptible of breaking down into smaller particles when compressed. The tendency of the softer particles to break down into smaller particles when between glass sheets undergoing simultaneous bending makes it less likely that the particles will cause bull's-eyes of the nature that result when harder particles of untreated silica penetrate the glass surface and, particularly when the larger particles of silica having a wider dispersion of particle sizes engage the heat softened glass. In addition, classifying the silica particles prior to applying them to an interfacial glass surface as a parting medium makes it possible to dispense amorphous precipitated silica particles that have a narrower, more restricted distribution range of particle sizes than untreated silica.

The amorphous precipitated silica disclosed in the present invention for use as a parting material is non-carcinogenic, easily dispersed in an aqueous dispersion, relatively free of abrasive contaminants that scratch glass or coatings on glass during simultaneous bending, readily removed from the bent glass by washing and, if it is not removed from the bent glass by washing, blends into the polyvinyl butyral interlayer when the pair of simultaneously bent glass sheets are laminated to an interlayer.

DESCRIPTION OF PREFERRED EMBODIMENTS

At present, the best mode of the present invention involves applying amphorous precipitated silica of the type used as flatting agents for paints, to at least one of the interfacial surfaces of a pair of glass sheets prior to simultaneously sag or press bending the glass sheets in a manner well known to those skilled in the art. Precipitated silicas of this type can be prepared in a manner as disclosed in U.S. Pat. Nos. 4,681,750 to Johnson et al. and 4,095,994 to Crawford et al., the teachings of both patents being hereby incorporated by reference. Silica particles of the type disclosed in the present invention tend to break down into smaller size particles when interposed between heat-softened glass sheets undergoing simultaneous sag bending rather than penetrate the interfacial surfaces of the heat-softened glass as is the case using untreated silica particles.

Precipitated silicas of the preferred type are available from PPG Industries, Inc. under the trade name LO-VEL ® for flatting agents. These materials have the common characteristic of being formed of aggregates of amorphous precipitated silica having an ultimate particle size of 0.021 microns, and have the following characteristics related in Table I:

TABLE I

Comparison of PPG Products by Trade Name

| Trade Name | Particle Size Distribution (Microns) | | | |
|---|---|---|---|---|
| | Median Particle Size Microns | 90% Greater Than | 10% Greater Than | Typical Hegman Grind |
| LO-VEL ® HSF | 9.6 | 3.9 | 11.7 | 5 |
| LO-VEL ® 27 | 4 | 2.8 | 9 | 6 |
| LO-VEL ® 29 | 7 | 3 | 14 | 5 |
| LO-VEL ® 39A | 10 | 3.5 | 25 | 2-3 |

Note: Particle size distribution was determined according to ASTM C 690-80 as modified in U.S. Pat. No. 4,927,802 to Leatherman, column 5 lines 2-16, which teachings are hereby incorporated by reference.

The preferred material to be used as a parting medium as disclosed in the present invention is LO-VEL ® HSF flatting agent.

EXAMPLE

To evaluate the effectiveness of amorphous precipitated silica as a parting material and in reducing bull's-eyes, different parting materials were applied to an interfacial surface of glass sheets bent in pairs for a test windshield configuration which was particularly susceptible to bull's eye defects. The parting material was applied using conventional spray gun application techniques that are well known to those skilled in the art. Each laminated windshield was inspected for bull's-eyes after lamination. For this test, the glass sheet pairs of control Group A were prepared using commercial CELITE ® diatomaceous earth, Group B glass sheet pairs were treated with purified talcum powder from Fisher Scientific, Pittsburgh, PA, Group C glass sheet pairs were treated with LO-VEL ® 39A flatting agent and Group D glass sheet pairs were treated with LO-VEL ® 29 flatting agent. The parting medium concentration, the number of windshields in each test group, the percentage in each test group that had bull's-eyes and the percentage of test windshields rejected due to bull's-eye is reported in Table II.

TABLE II

| Group | Concentration (Dry Quart/Gal. of Water) | Total Windshields | % Rejection Due to Bull's-eye |
|---|---|---|---|
| A | 0.1 | 243 | 5.4 |
| B | 0.2 | 134 | 13.4 |
| C | 2.0 | 128 | 3.9 |
| D | 1.5 | 98 | 4.1 |

The results shown in Table II indicate the superiority of amorphous, precipitated silica (Groups C and D) over untreated silica (Groups A and B) as parting materials for bending glass sheet pairs to reduce the total number of bull's-eyes and to reduce the number of windshields rejected due to bull's-eyes. A subsequent test run under normal production conditions using a mixture of 3.25 lbs. (1.47 kg) LO-VEL ® HSF flatting agent and 50 gallons (189 liters) of water as parting material yielded an average of less than 10 bull's-eyes per shift, which amounted to a rejection rate based on bull's-eyes of less than 1%.

According to the provisions of the patent statutes, the preferred embodiment of this invention has been described. However, it is understood that the invention may also be practiced otherwise than as specifically illustrated and described as recited in the claimed subject matter that follows.

What is claimed is:

1. In a method of simultaneously bending a pair of glass sheets wherein said sheets are supported in overlaying relation, heated to a temperature at which said sheets are capable of being deformed and simultaneously shaping said sheets, the improvement comprising:
   interposing a parting material consisting essentially of amorphous precipitated silica particles between said glass sheets prior to said simultaneous bending.

2. The method as in claim 1 wherein said precipitated silica particles have a MOHS hardness of less than one.

3. The method as in claim 1 wherein said precipitated silica particles are in the form of agglomerates of siliceous material that are susceptible of breaking down into smaller particles.

4. The method as in claim 3 wherein said precipitated silica particles have a particle size distribution such that approximately 90% of said particles have a particle size diameter of at least 2.8 microns and approximately 10% of said particles have a particle size diameter of at least 9 microns.

5. The method as in claim 4 wherein said precipitated silica particles have a median particle size on the order of 4 to 10 microns.

6. The method as in claim 5 wherein said precipitated silica particles have a MOHS hardness of less than one.

7. The method as in claim 5 further including the step of mixing said silica particles with a water carrier to form a slurry and said interposing step includes applying said slurry between said glass sheets.

8. The method as in claim 7 wherein said applying step includes the step of applying said slurry prior to heating said glass sheets.

9. The method as in claim 8 wherein said slurry is a mixture of approximately 3.25 pounds of said silica particles and approximately 50 gallons of water.

10. The method as in claim 3 wherein said amorphous precipitated silica particles have a particle size distribution such that approximately 90% of said particles have a particle size diameter of at least about 3.9 microns and approximately 10% of said particles have a particle size diameter of at least about 11.7 microns.

11. The method as in claim 10 wherein said amorphous precipitated silica particles have a median particle size of approximately 9.6 microns.

12. The method as in claim 11 wherein said precipitated silica particles have a MOHS hardness of less than one.

13. The method as in claim 3 wherein said interposing step includes applying said silica particles prior to heating said glass sheets.

14. The method as in claim 3 further including the step of mixing said silica particles with a water carrier to form a slurry and said interposing step includes applying said slurry between said glass sheets.

15. The method as in claim 14 wherein said applying step includes the step of applying said slurry prior to heating said glass sheets.

16. The method as in claim 15 wherein said slurry is a mixture of approximately 3.25 pounds of said silica particles and approximately 50 gallons of water.

17. The method as in claim 16 wherein said precipitated silica particles have a MOHS hardness of less than one.

18. In a method of simultaneously bending a plurality of glass sheets, said method including the steps of supporting a pair of glass sheets in overlying relation, heating the sheets to a temperature at which said sheets are capable of being deformed and simultaneously shaping said sheets, the improvement comprising the step of:
interposing a parting material between said glass sheets prior to said simultaneous shaping step wherein said parting material consists essentially of amorphous precipitated silica particles which particles are in the form of agglomerates of siliceous material that are of lower hardness than untreated silica and are susceptible of breaking down into smaller particles when compressed.

* * * * *